H. HIGGIN.
REACH FOR VEHICLES.
APPLICATION FILED NOV. 24, 1909.
972,191.
Patented Oct. 11, 1910.
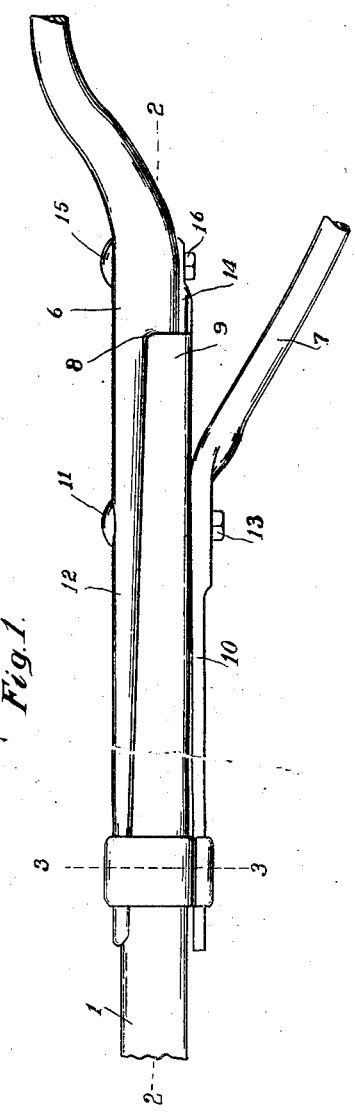
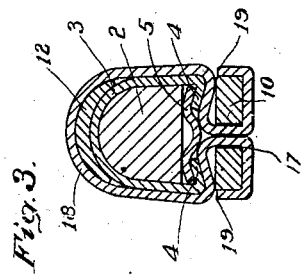
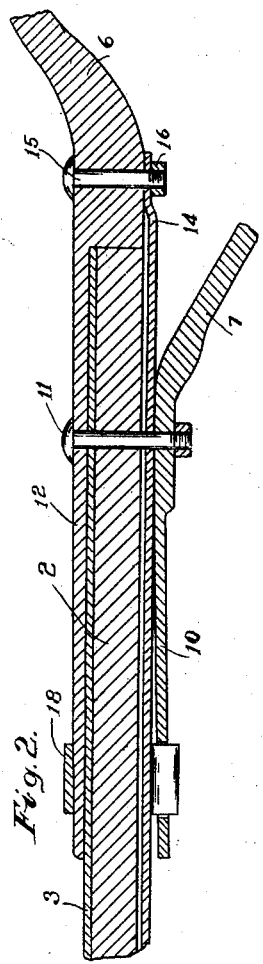
Witnesses
Inventor
Henry Higgin
by Alfred M. Allen
Attorney

UNITED STATES PATENT OFFICE.

HENRY HIGGIN, OF NEWPORT, KENTUCKY, ASSIGNOR TO THE HIGGIN MANUFACTURING COMPANY, OF NEWPORT, KENTUCKY, A CORPORATION OF WEST VIRGINIA.

REACH FOR VEHICLES.

972,191.

Specification of Letters Patent.

Patented Oct. 11, 1910.

Application filed November 24, 1909. Serial No. 529,667.

*To all whom it may concern:*

Be it known that I, HENRY HIGGIN, a citizen of the United States, and a resident of the city of Newport, in the county of Campbell and State of Kentucky, have invented certain new and useful Improvements in Reaches for Vehicles, of which the following is a full, clear, and exact description, reference being had to the accompanying drawings, forming a part of this specification.

My invention relates to reaches for road vehicles, and it has more particularly relation to metal reaches especially those constructed of a metal shell with filling of wood or like material, and the object of my invention is to provide an effective and simple means for securing the reach at front and rear to the fifth wheel construction and to the rear axle. The ordinary method of securing such reaches is to provide nuts and bolts with openings through the reach and the extension iron, but I have found that the jars and strains to which the reach is subjected tends to crystallize the metal around the bolt opening, and more particularly does this crystallization take place at the first bolt opening where most of the vibration is concentrated.

It is the object of my invention to remedy this difficulty, and it consists essentially in the substitution for the ordinary nut and bolt, of a metal clip to embrace and combine the parts to be united, the clip being so constructed and attached that no bolts are necessary to hold the same in place.

In the drawings,—Figure 1 is a side elevation of the end of a metal reach illustrating my invention. Fig. 2 is a central longitudinal section of the same. Fig. 3 is a transverse section through the retaining clip.

1 is the front end of one of the reaches of a road vehicle, and in the construction to which I have applied my invention, this reach comprises a wood core 2, with a metallic shell 3 embracing the top and sides of the reach and provided with flanges 4, 4, which are locked under the metal base plate 5 of the reach. This particular construction of reach, however, is not at all material, but the invention is especially applicable to reaches which are formed of metal shells, and where the usual bolt and nut method of uniting the reach to the extension irons is very liable to be subjected to crystallization of the metal around the bolt opening.

6 is the extension iron to the headblock, and 7 is the brace iron to the front axle. A shoulder 8 is formed on the extension iron, and the same butted up against and fitted partially around the forward end 9 of the reach. The brace iron 7 is turned so that its rear end 10 will contact with the under surface of the reach.

11 is a bolt which is passed down through openings in the outer end 12 of the extension iron 6 through the reach and through the brace where the parts are united together and held by tightening the nut 13. The forward end of the bottom plate of the reach is extended at 14 and secured by the bolt 15 and nut 16 to the extension iron 6.

Instead of providing a bolt and nut for the ends of the extension iron and brace, I form a longitudinal slot 17 in the outer end of the brace iron 10, and pass a clip 18 over the end 12 of the extension iron, around under the base of the reach on each side through the slot 17, and then bend each end of the clip outwardly along the bottom of the iron 10 and back along the sides to the bend of the clip at 19, 19, on each side. In this way, I rigidly and firmly secure the ends of the extension and brace irons to the reach without the use of bolts, and without the necessity of weakening the reach in any way by forming an opening therein.

In providing the particular form of clip and securing same as described, I obtain a very effective and simple construction, in which the ordinary clip plate is dispensed with, which necessitates the use of nuts and bolts which gather dirt and are unsightly in appearance. The clip when secured in place is smooth and neat fitting throughout and the ends of the clip fit against the turned under parts, so that to the eye, I provide the effect of a seamless band.

What I claim as new, and of my invention and desire to secure by Letters Patent, is:—

1. In a device of the character specified in combination with a metallic reach, of extension plates for securing the same to the carrying axle, and a clip to embrace the plates to be secured, one of the plates being provided with a slit, and the clip having ends to pass through said slit and lock around the plate to secure same without the use of bolts.

2. In a device of the character specified in combination with a metallic reach, of extension plates for securing the same to the carrying axle, and a clip to embrace the plates to be secured, one of the plates being provided with a longitudinal central slit, and the clip having ends to pass between the reach and plate through said slit and around the plate back to the reach on both sides.

HENRY HIGGIN.

Witnesses:
S. B. DEAL,
K. SMITH.